(12) United States Patent  (10) Patent No.: US 7,747,009 B2
Cullman  (45) Date of Patent: Jun. 29, 2010

(54) RETAINING DEVICE FOR MOBILE USER DEVICES

(75) Inventor: Wolfgang Cullman, Langenzenn (DE)

(73) Assignee: Audioton Kabelwerk GmbH, Scheinfeld (DE)

( * ) Notice: Subject to any disclaimer, the term of this patent is extended or adjusted under 35 U.S.C. 154(b) by 1022 days.

(21) Appl. No.: 10/546,900

(22) PCT Filed: Feb. 23, 2004

(86) PCT No.: PCT/DE2004/000338

§ 371 (c)(1),
(2), (4) Date: Jul. 11, 2006

(87) PCT Pub. No.: WO2004/076238

PCT Pub. Date: Sep. 10, 2004

(65) Prior Publication Data

US 2007/0228095 A1  Oct. 4, 2007

(30) Foreign Application Priority Data

Feb. 25, 2003 (DE) ............................... 103 08 189

(51) Int. Cl.
*H04M 1/00* (2006.01)
*H04M 9/00* (2006.01)
(52) U.S. Cl. ..................... 379/446; 379/455; 455/575.9

(58) Field of Classification Search ................. 379/446, 379/447, 454, 455; 455/569.1, 569.2, 575.1, 455/575.9
See application file for complete search history.

(56) References Cited

U.S. PATENT DOCUMENTS

| 5,885,088 | A | 3/1999 | Brennan et al. |
| 5,961,337 | A | 10/1999 | Kordes |
| 6,341,218 | B1 | 1/2002 | Poplawsky et al. |
| 7,068,783 | B2 * | 6/2006 | Peiker ................... 379/446 |
| 2002/0032042 | A1 * | 3/2002 | Poplawsky et al. .......... 455/564 |
| 2002/0039417 | A1 * | 4/2002 | Walsh ................... 379/454 |
| 2003/0128840 | A1 * | 7/2003 | Luginbill et al. ............ 379/455 |

FOREIGN PATENT DOCUMENTS

| DE | 37 38 389 A 1 | 5/1989 |
| DE | 41 07 995 A 1 | 9/1992 |
| DE | 298 14 956 U 1 | 7/1999 |
| DE | 101 31 169 A 1 | 1/2003 |
| EP | 1 278 356 A2 | 1/2003 |

* cited by examiner

*Primary Examiner*—Tuan D Nguyen
(74) *Attorney, Agent, or Firm*—Fulbright & Jaworski, LLP

(57) ABSTRACT

The invention relates to a retaining device for the purpose of mechanically and electrically connecting a mobile user device, in particular a mobile radio telephone or a PDA, to a vehicle.

22 Claims, 6 Drawing Sheets

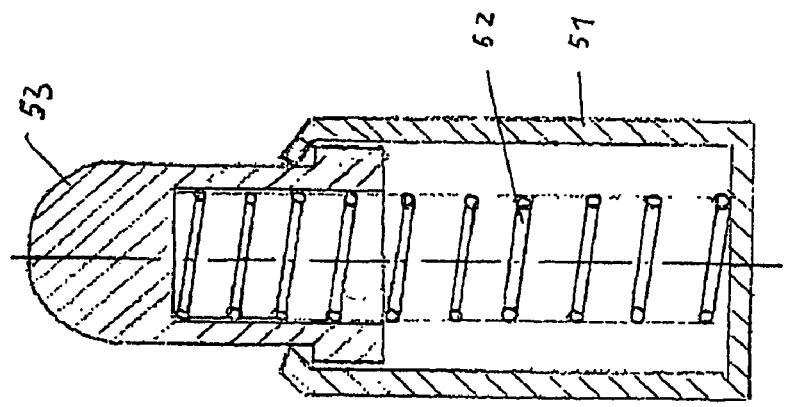
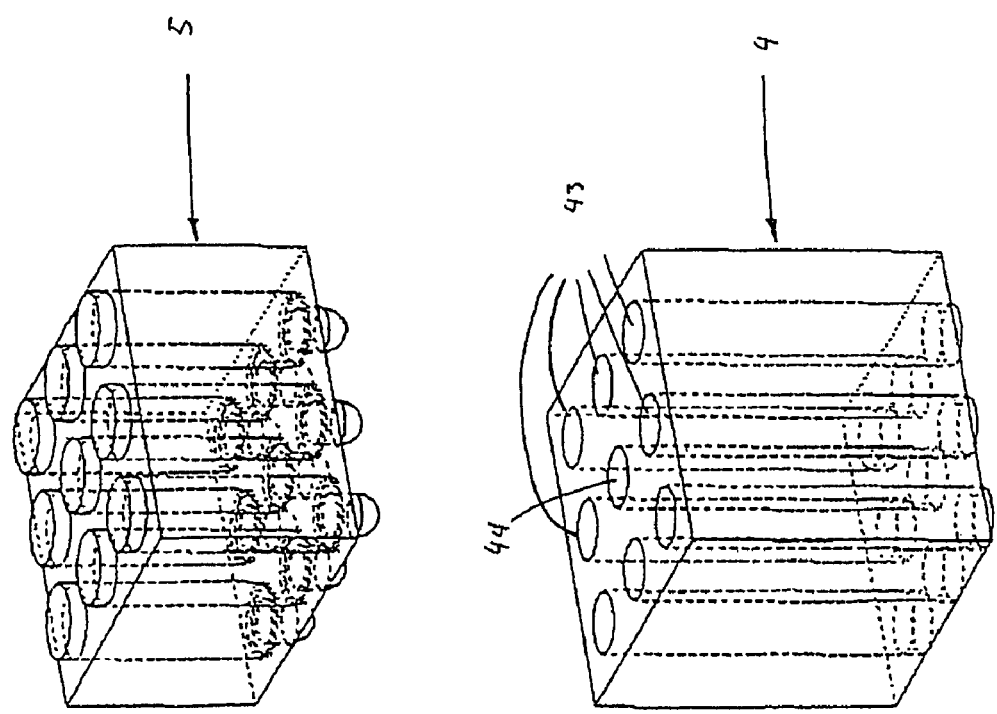

RETAINING DEVICE FOR MOBILE USER DEVICES

CROSS-REFERENCE TO RELATED APPLICATIONS

This application is the National Phase of International Application No. PCT/DE2004/000338 filed Feb. 23, 2004 which claims priority to German Application No. 10308189.5 filed Feb. 25, 2003.

TECHNICAL FIELD

The invention relates to a retaining device for the purpose of mechanically and electrically connecting a mobile user device, in particular a mobile radio telephone or a PDA (PDA=personal digital assistant), to a vehicle. The invention also relates to a base part for the retaining device for the purpose of permanently fixing it in the vehicle and to a retaining part of the retaining device for the purpose of accommodating the mobile user device.

BACKGROUND OF THE INVENTION

DE 298 14 956 U1 describes a mobile telephone holder for a vehicle which comprises a base part and a telephone retaining part which matches the shape of the mobile radio telephone and serves the purpose of accommodating the mobile telephone. The base part is provided for the purpose of permanently fixing the mobile telephone holder in the vehicle. In this case, it has three hook elements by means of which the base part can be connected to the telephone retaining part. The base part is in this case simply a retaining plate which merely serves the purpose of mechanically fixing the telephone retaining part. The telephone retaining part is provided with a connection cable which connects the telephone retaining part to a handsfree device.

BRIEF SUMMARY OF THE INVENTION

The invention is now based on the object of improving the mechanical and electrical connection of a mobile user device to a vehicle.

This object is achieved by a retaining device for the purpose of mechanically and electrically connecting a mobile user device, the retaining device having a base part for the purpose of permanently fixing it in the vehicle and a retaining part for the purpose of accommodating the mobile user device, the base part having at least one rigid first hook element and at least one resilient second hook element which are arranged at a distance from one another protruding upward on the upper side of the base part facing the retaining part, the base part having an electrical connection element for the purpose of electrically connecting the base part to the retaining part, said electrical connection element being arranged on the upper side of the base part facing the retaining part between the at least one rigid first hook element and the at least one resilient second hook element, the underside of the retaining part facing the base part having at least one first cutout for the purpose of latching with a first hook element and at least one second cutout, which is arranged at a distance from said first cutout, for the purpose of latching with a second hook element, and the retaining part having an electrical connection element for the purpose of electrically connecting the retaining part to the base part, said electrical connection element being arranged on the underside of the retaining part facing the base part between the at least one first cutout and the at least one second cutout. This object is further achieved by such a base part and such a retaining part for a retaining device for the purpose of mechanically and electrically connecting a mobile user device to the vehicle.

The invention makes it possible to achieve a reliable, mechanical and electrical connection between the base part and the retaining part:

Owing to the latching of the upwardly protruding first and second hook elements and the first and second cutouts in the retaining part, the retaining part is reliably and temporarily fixed, a uniform contact pressure between the electrical connection elements of the base part and of the retaining part is produced, and the contact elements, associated with one another, of these electrical connection elements are fixed to one another in a reliable manner. A temporary mechanical connection and a temporary electrical connection between the retaining part and the base part are thus simultaneously produced, these connections being equal to the stringent requirements existing in a vehicle (vibration, high temperature differences, contamination, crash safety) both as regards the mechanical load bearing capacity and electrical contact safety.

In this case, it is also particularly advantageous for it to be possible for such an electrical and mechanical connection to be realized with little complexity in terms of moving parts, as a result of which the operational reliability is increased and production costs are reduced.

Advantageous refinements of the invention are explained in the subclaims.

It is expedient for the base part to have a centrally arranged first hook element and two second hook elements which are arranged at a distance from one another. The base part and the retaining part are accordingly fixed with respect to one another in the form of three point retention, as a result of which, even at a very low level of production technology, sufficient fixing of the electrical connection elements and uniform contact pressure between the contact elements of these electrical connection elements can be achieved.

It is further expedient for the second hook elements to be mounted in a resilient manner such that they can move in the longitudinal direction of the base part, and for the hooks of the first rigid hook element and the hooks of the second hook element to be oriented in opposition. As a result, the vibration resistance of the connection is increased.

In accordance with one preferred exemplary embodiment of the invention, the base part also has at least one third resilient hook element which is arranged between the first hook element and the electrical connection element. Correspondingly, the retaining part has at least one third cutout for the purpose of latching with a third hook element of the base part, said cutout being arranged between the first cutout and the electrical connection element. Owing to the hook elements arranged on both sides of the electrical connection element, the mutual fixing of the electrical connection elements in relation to one another is further improved and the contact pressure of the contact elements is kept constant even in the case of severe vibrations and temperature fluctuations. Furthermore, it is hereby possible for deformation of the retaining part or of the base part owing to forces acting in the latched position to be largely prevented.

In this case, it is particularly advantageous for the third hook element(s) to be mounted in a resilient manner such that it/they can move and such that it/they is/are offset through 90° with respect to the second hook element(s). This improves the vibration resistance of the electrical connection both in the transverse direction and in the longitudinal direction, with the result that electrical contact problems can reliably be avoided even on use for a number of years. In this case, it has proven to be particularly advantageous for two third hook elements to be mounted in a resilient manner such that they can move in opposition transversely with respect to the longitudinal direction of the base part. This provides a vibration-resistant connection without play.

In accordance with a further preferred exemplary embodiment of the invention, the base part accordingly has at least one second hook element which is mounted in a resilient manner such that it can move in the longitudinal direction of the base part and two third hook elements which are mounted in a resilient manner such that they can move in opposition transversely with respect to the longitudinal direction of the base part. Owing to the two snap connections, which are rotated through 90° with respect to one another and of which the snap connection acting in the longitudinal direction acts owing to the combination of a rigid hook element and a moving hook element, a high degree of vibration resistance and ageing resistance paired with a high degree of user friendliness is achieved. The rigid hook element in this case acts as a pivot point which makes possible rapid latching of the two latching connections, which are offset through 90°, even under adverse conditions (poor light conditions, vibration). Such a retaining device thus also ensures a high degree of user friendliness.

Owing to the two measures described below, it is also possible to improve the uniformity of the contact pressure of the two interacting connection elements and thus the fault tolerance of the electrical connection between the base part and the retaining part:

Firstly, it is possible to provide two second hook elements which are arranged in the immediate vicinity of the corners of the electrical connection element of the base part. Correspondingly, the retaining part is equipped with two second cutouts which are likewise arranged in the immediate vicinity of the corners of the electrical connection element of the retaining part. It is also possible to provide two third resilient hook elements which are arranged opposite one another in the immediate vicinity of the longitudinal edges of the base part. Correspondingly, the retaining part is provided with two third cutouts which are arranged opposite one another in the immediate vicinity of the longitudinal edge of the retaining part.

In order to make it possible to detach the connection between the base part and the retaining part in a reliable and convenient manner, in accordance with a preferred exemplary embodiment of the invention the following is proposed:

The base part has a slide element which is mounted in a resilient manner such that it can move in the longitudinal direction of the base part and is connected to the at least one second hook element. Furthermore, the base part has at least one actuating element which is mounted in a resilient manner such that it can move transversely with respect to the longitudinal direction of the base part. The slide element and the actuating element have beveled faces which are in touching contact with one another, as a result of which a transverse movement of the at least one actuating element is converted into a longitudinal movement of the slide element.

In this case, it is advantageous for the third hook element(s) to be connected to the at least one actuating element. It is further advantageous for the base part to have two third hook elements and two actuating elements arranged in opposition, one third hook element being connected to one actuating element, and the other third hook element being connected to the other actuating element, and in this case the hooks of the two hook elements being oriented in opposition. This results in the above-specified advantages of a particularly vibration- and ageing-resistant electrical connection between the base part and the retaining part paired with a high degree of user friendliness when fixing and detaching the connection and of a robust, long-life mechanism. Furthermore, when latching the third hook elements, the second hook elements are concomitantly moved slightly, with the result that the force required overall for the latching is reduced, and the load on the flanks of the second cutouts (which have a greater load) is relieved.

Furthermore, it is expedient for the base part to have a first spring which exerts a force, in the direction of the first hook element, on the slide element, and for the base part to have a second spring which exerts a force, in the direction of the outside of the base part, on the at least one actuating element. This results in a simple and cost-effective latching mechanism.

In accordance with a preferred exemplary embodiment of the invention, the electrical connection elements have two or more electrically conductive contact elements arranged in one or more rows, the contact elements of the base part and the contact elements of the retaining part being in touching contact such that they are aligned with one another at their mutually facing ends when the base part and the retaining part are latched. Owing to such a symmetrical design of an electrical connection element in combination with the latching used in this case, a uniform distribution of the contact pressure of the contact elements is required, as a result of which electrical contact-making is improved. In this case, it is advantageous for an electrical connection element to be used both for transmitting RF and for transmitting AF signals. For example, two or more adjacent contact elements are used for transmitting RF signals and one or more of the remaining contact elements are used for transmitting AF signals or are used for power supply purposes. This makes it possible to avoid the use of a coaxial plug connection by means of which susceptibility to electrical contact problems would be increased. In this case, it is particularly advantageous for the electrical connection element to be in the form of a connection element having an arrangement in three rows of electrically conductive contact elements.

It is expedient for the electrical connection element of the base part to have two or more electrically conductive contact elements which form contact faces in their end faces, and for the electrical connection element of the retaining part to have two or more electrically conductive contact elements which are in the form of resilient contact pins. As a result, the entire retaining device is less susceptible to contamination and dust.

BRIEF DESCRIPTION OF THE DRAWINGS

The invention will be explained by way of example below with reference to a plurality of exemplary embodiments with the assistance of the attached drawings, in which:

FIG. 4 shows a three-dimensional illustration of two electrical connection elements.

FIG. 5 shows a sectional illustration of a contact element.

DETAILED DESCRIPTION OF THE INVENTION

Figure 1:
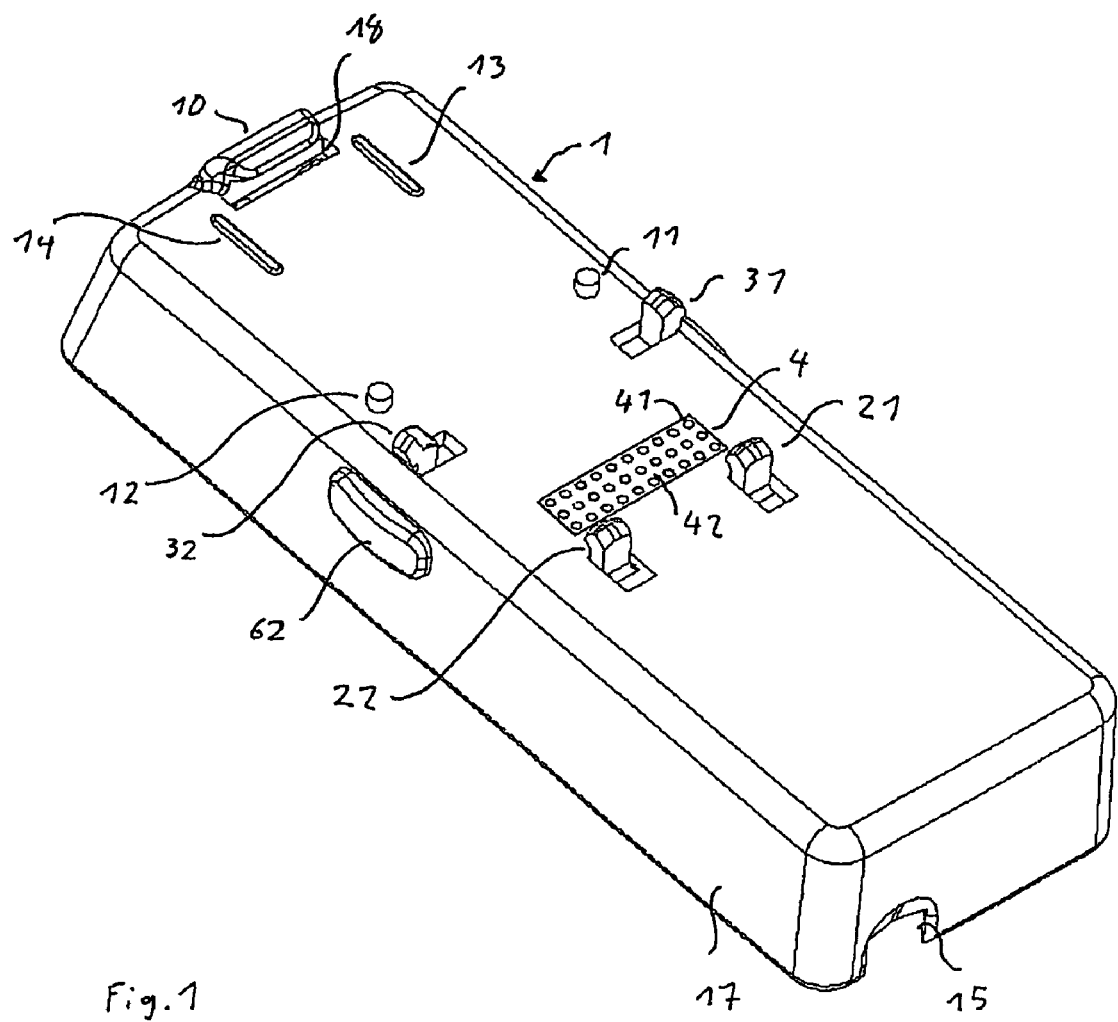
FIG. 1 shows a perspective view of a base part according to the invention for a retaining device according to the invention for the purpose of mechanically and electrically connecting a mobile user device to a vehicle.

FIG. 1 shows a base part of a retaining device for mobile user devices, in particular mobile telephones or PDAs (PDA=personal digital assistant). Such user devices have input and output interfaces for the purpose of communicating with a user, for example via a display, a keypad, a microphone, a loudspeaker or via a video camera. They also have an interface for the purpose of communicating via a communications network, preferably for the purpose of communicating via a radio-assisted communications network. For example, they have a radio part for the purpose of communicating in accordance with the GSM standard or UMTS standard or for the purpose of communicating via a wireless LAN (GSM=global system for mobile communication, UMTS=universal mobile telecommunication system). However, it is also possible for them to have a Bluetooth or an infrared interface (for example for access to the Internet).

The base part 1 has a housing 17, a plurality of hook elements 21, 22, 31, 32 and 10, an electrical connection element 4 and two actuating elements, of which one actuating element 62 is shown in FIG. 1. The connection element 4 is an electrical connection element and has two or more electrically conductive contact elements 41 arranged in rows and a base body 42 made from a nonconductive material.

The housing 17 is parallelepipedal with beveled edges. The shape of the housing 17 is in this case matched to the shape of the retaining part to be used with it, this shape in turn being modeled on the shape of the mobile user device to be accommodated, in this case a mobile radio telephone. Depending on the type of mobile user device used, the shape of the housing to be used can differ from the shape of the housing 17 shown in FIG. 1.

In addition to the components shown in FIG. 1, the base part 1 also has fixing means for the purpose of fixing the base part in the vehicle. For example, the base part has a bottom plate which is provided with holes for the purpose of screwing the base plate to vehicle parts, cutouts for the purpose of latching the base parts to vehicle parts or faces for the purpose of adhesively bonding the base plate to vehicle parts. Furthermore, it is also possible for the base part to have electronics arranged in the housing 17 which provide, for example, functions such as those of a handsfree device. The housing 17 also has a plurality of cutouts. For example, a cutout 15 is shown in FIG. 1 which acts as an actuating cutout for a volume dial. Cutouts are also provided which serve the purpose, for example, of connecting plugs, microphones or of accommodating a data socket or which form slits for the purpose of accommodating processor/memory cards. Also shown in FIG. 1 is a cutout 18 below the hook element 10, cutouts for the purpose of guiding the hook elements 21, 22, 31 and 32, a cutout for the purpose of guiding through the electrical connection element 4 and a cutout for the purpose of guiding through the actuating element 62.

The upper side of the base part 1 facing the retaining part is preferably, as also illustrated in FIG. 1, largely flat and parallelepipedal. Only the hook elements 10, 21, 22, 31, 32, centering elements 11 and 12 and webs 13 and 14 protrude from this flat surface. Owing to this largely flat surface design, the susceptibility of the electrical and mechanical connection to contamination and dust is reduced. The two centering elements 11 and 12 serve the purpose of additionally centering the retaining part with respect to the base part in the latched state. It is naturally also possible for another number of centering elements 11 and 12 to be selected, another shape of the centering elements to be selected or for them to be positioned in a different way. When positioning the centering elements 11 and 12, however, in this case care should be taken that they are not positioned too close to the hook element 10 and are not positioned too far away from the hook element 10, in order not to reduce the user friendliness. The centering elements 11 and 12 are preferably to be positioned between the hook element 10 and the electrical connection element 4, as close as possible to the side edges of the housing 17. However, it is also possible for the centering elements 11 and 12 to be dispensed with.

The webs 13 and 14 serve the purpose of ensuring a robust latching of the fixed hook element 10 in the associated cutout in the retaining part. The height of the webs 13 and 14 is in this case quite low and is, for example, in the range from 0.2 to 0.5 mm. It is naturally also possible for the cutout 18 and the webs 13 and 14 to be dispensed with.

The hook element 10 is positioned centrally at the top end of the housing 17. The hook element 10 is in this case broader than the hook elements 21, 22, 31 and 32 and has a width of approximately 1.5 cm. The hook element 10 is a rigid hook element. This means that the hook element does not snap back for the purpose of latching with the associated cutout in the retaining part. It is naturally also possible for two more rigid hook elements to be provided or another width to be selected for the hook element 10.

The hook elements 31, 32, 21 and 22 are resilient hook elements which snap back for latching purposes and thus make latching possible without a longitudinal or transverse movement between the retaining part and the base part.

The hook elements 21, 22, 32 and 31 are substantially narrower than the hook element 10. For example, the hook elements 22, 21, 31 and 32 have a width of 4 mm. The hook elements 31, 32, 21 and 22 are mounted in a resilient manner such that they can carry out a snap movement of, for example, 3 mm for the purpose of latching with associated cutouts in the retaining part. For this purpose, it is firstly possible for the hook elements 21, 22, 31 and 32 to be mounted such that they can move with the engagement of one or more spring elements, or for the hook elements to be fixedly connected to the housing 17 and to snap back in a resilient manner on latching owing to their shape and owing to the material used for them.

It is also possible for the hook elements 31 and 32 to be dispensed with. Furthermore, it would also be possible for a centrally arranged hook element to be provided in place of the hook elements 21 and 22 which is arranged, when viewed from the hook element 10, behind the electrical connection element 4. Furthermore, it is naturally also possible for three or more hook elements arranged in a row to be provided in place of the hook elements 21 and 22. A critical factor here is the fact that the electrical connection element 4 is arranged between the rigid hook element 10 and these resilient hook elements. This means that the distance between the rigid hook element 10 and the resilient hook element is greater than the distance between the fixed hook element 10 and the electrical connection element. As is shown in FIG. 1, the hooks of the hook element 10, on the one hand, and the hooks of the hook elements 21 and 22, on the other hand, are oriented in opposition, the hook elements 21 and 22 being mounted in a resilient manner such that they can move in the longitudinal direction of the base part. Furthermore, the hook elements 21 and 22, as shown in FIG. 1, are arranged in the immediate vicinity of the corners of the electrical connection element 4. The distance between the corners of the connection element 41 and the hook elements 21 and 22 is, for example, 4 mm and is dimensioned such that the hook elements are arranged as close as possible to the corners of the electrical connection element 4 whilst maintaining problem-free insertion of electrical connection element 4.

The hook elements 31 and 32 are arranged between the electrical connection element 4 and the hook element 10 in the immediate vicinity of the longitudinal edges of the base part 1. As can be seen in FIG. 1, the hook part 32, for example, adjoins directly the rounded section of the side edge of the housing part 17 and is accordingly located at the edge of the planar upper side of the housing 17. The two hook elements 31 and 32 are in this case mounted in a resilient manner such that they can move in opposition transversely with respect to the longitudinal direction of the base part 1, with the result that the hook elements 21 and 22, on the one hand, and the hook elements 31 and 32, on the other hand, are mounted in a resilient manner such that they can move and such that they are offset through 90° with respect to one another. In opposition in this case means that the hook elements 31 and 32 are moved in opposite directions. As shown in FIG. 1, the hooks of the hook elements 31 and 32 are oriented in the direction of the respective outer edge, and the hook elements 31 and 32 are moved towards one another during latching.

It is naturally also possible for the hooks of the hook elements 31 and 32 to be oriented inward and for the hook elements to be moved outward during latching.

Figure 2:
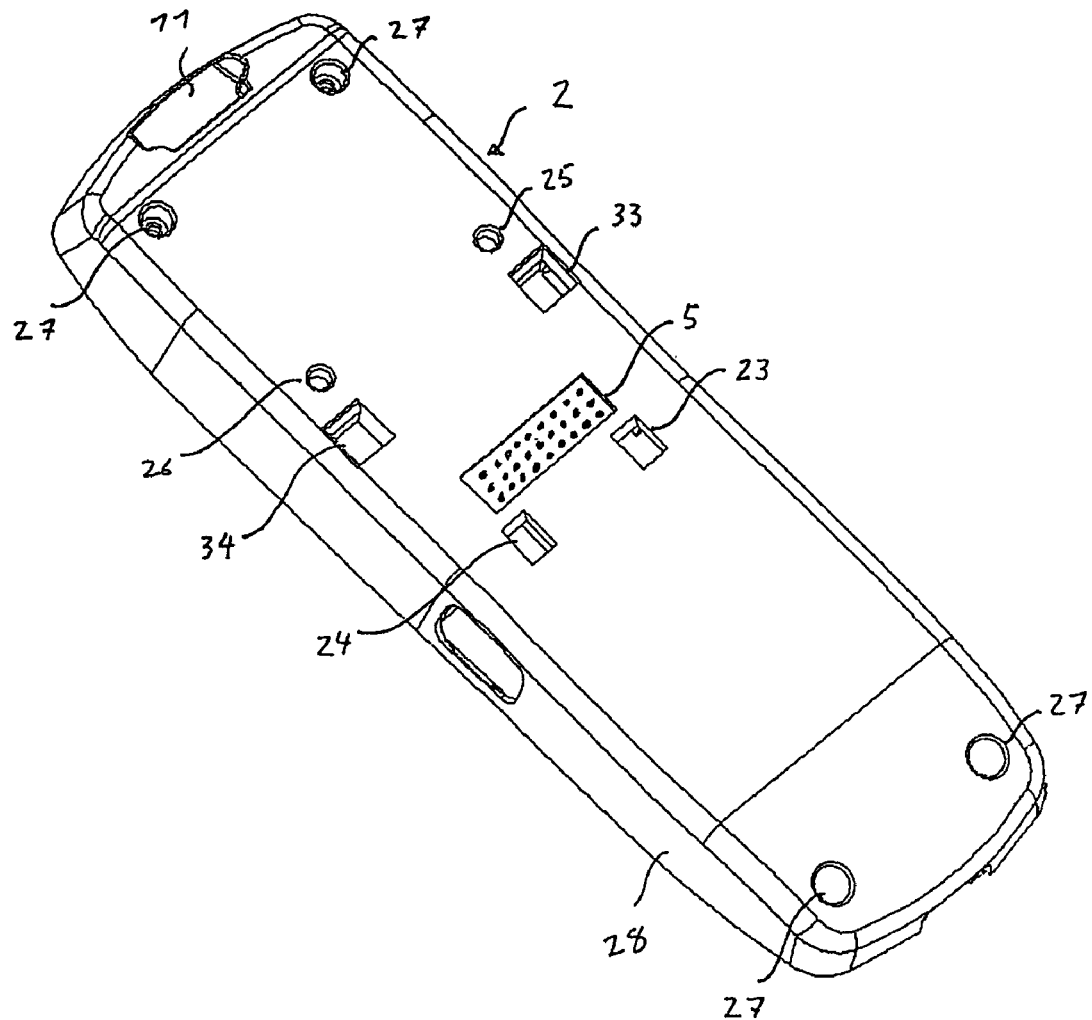
FIG. 2 shows a perspective view of a retaining part according to the invention for use with the base part shown in FIG. 1.

FIG. 2 shows a view of the underside of a retaining part 2 facing the base part 1, said retaining part 2 serving the purpose of accommodating the mobile user device. The front side of the retaining part 2 is in this case shaped such that mechanical and electrical coupling is possible between the mobile user device and the retaining part. For example, the front part of the retaining part 2 has a shape which is matched to the shape of the mobile user device to be accommodated and which therefore makes it possible for the mobile user device to be inserted into the retaining part. The front part also has latching mechanisms which make a detachable mechanical connection between the user device and the retaining part possible. It also has one or more electrical connection elements, for example a correspondingly shaped plug, by means of which an electrical connection between the mobile user device and the retaining part can be produced. Furthermore, it is also possible for the retaining part to have electronics which process and/or pass on electrical signals and information exchanged between the base part and the mobile user device.

Of the components of the retaining part 2, FIG. 2 shows a part housing 28 having latching cutouts 11, 24, 23, 34 and 33, centering cutouts 25 and 26 and cutouts 27 for the purpose of screwing the part housing 28 to that part housing of the retaining part which forms the upper side of the retaining part.

The cutouts 11, 23, 24, 33 and 34 are arranged, corresponding to the hook elements 10, 22, 21, 32 and 31 associated with them, on the underside of the retaining part. The underside of the retaining part is further largely flat, as is the upper side of the base part. The centering cutouts 25 and 26 are arranged, corresponding to the centering elements 12 and 11 associated with them, on the underside of the retaining part 2. The retaining part 2 also has an electrical connection element 5 which is arranged correspondingly to the electrical connection element 4 of the base part 1.

It will now be explained with reference to FIG. 3 how a user latches the retaining part 2 with the base part 1.

Figure 3:
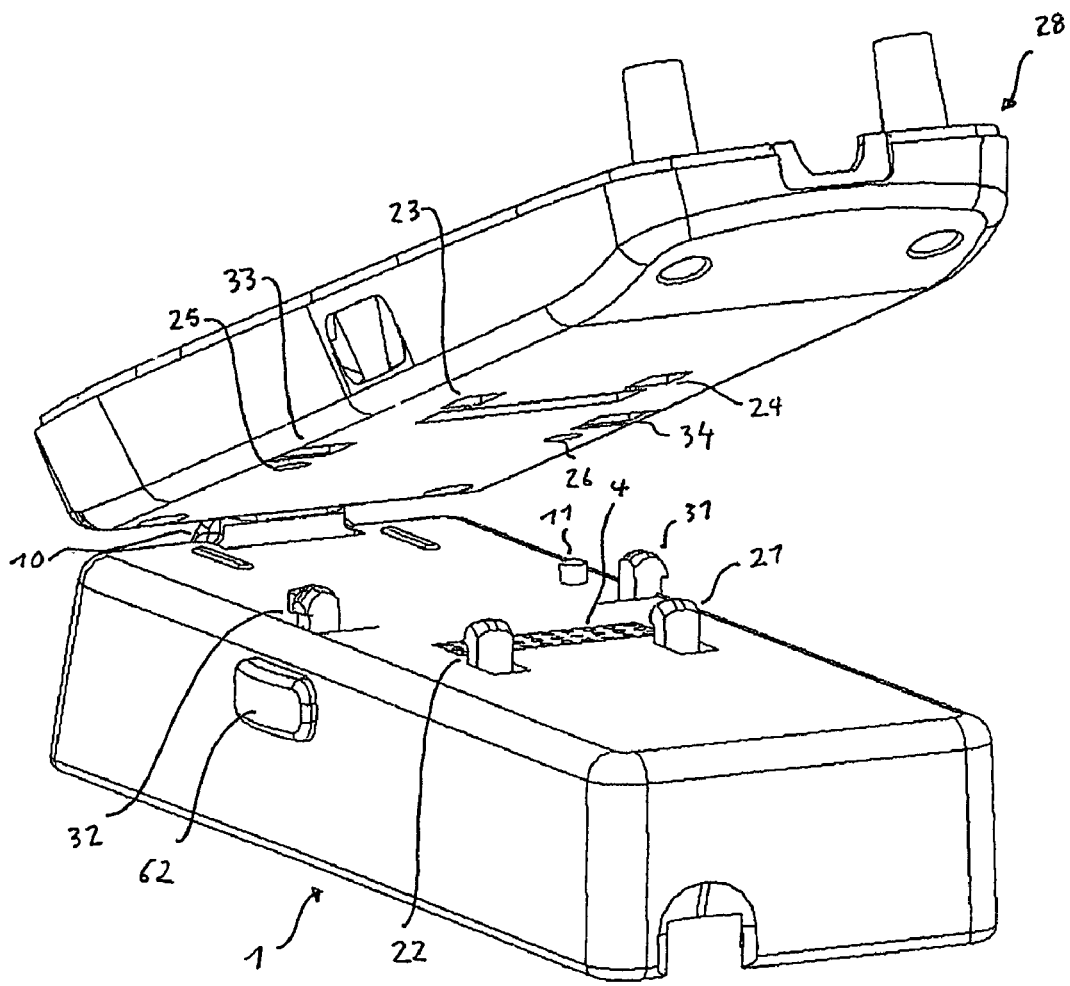
FIG. 3 shows a perspective illustration of part-components of a retaining device according to the invention.

FIG. 3 shows the base part 1 with the hook elements 21, 22, 31, 32 and 10, with the electrical connection element 4, with the centering element 11 and with the actuating element 62. FIG. 3 further shows the part housing 28 of the retaining part 2 with the latching cutouts 23, 24, 33 and 34 and with the centering cutouts 25 and 26.

As is illustrated in FIG. 3, the hook element 10 is inserted by the user into the associated cutout 11 in the retaining part 2. The hook element 10 and the cutout 11 act as a pivot point of a now following tipping movement by means of which the underside of the retaining part 2 is guided against the upper side of the base part 1 and is finally latched.

FIG. 4 shows, by way of example, the design of the electrical connection elements 4 and 5.

As is shown in FIG. 4, the connection element 4 has a base body made from an electrically nonconductive material, for example made from plastic, in which two or more electrically conductive contact elements are arranged. The electrical connection element 5 likewise preferably has a base body made from an electrically nonconductive material in which two or more electrically conductive contact elements are likewise arranged. The contact elements of the connection element 5 and the contact elements of the connection element 4 are arranged in the respective base body such that they are in touching contact with one another at their mutually facing ends such that they are aligned with one another during latching of the base part 1 and the retaining part 2. In this case, the ends of the contact elements of the connection element 4 are preferably in the form of contact faces, and the end faces of the contact elements of the connection element 5 are preferably in the form of contact pins which are mounted in a resilient manner as shown in FIG. 5. Thus, FIG. 5 shows a schematic illustration of a contact element 51 having a helical spring 52 and a contact pin 53.

It is naturally also possible for the contact elements of the connection elements 4 and 5 to have a different design, for example to be in the form of contact lugs, of contact faces or contact rails which are resilient on both sides or of a coaxial plug connection.

The connection elements 4 and 5 are preferably used both for transmitting RF and AF signals. For example, the contact elements given the references 44 and 43 of the connection element 4 are used for transmitting RF signals, and the remaining contact elements of the connection element 4 are used for transmitting AF signals. In this case, the contact element 44 forms an inner conductor which forms a waveguide from two or more outer conductors connected to ground, the contact elements 43. Furthermore, it would also be possible for an RF connection to be realized by means of an inner conductor and one or two adjacent outer conductors.

Figure 6:
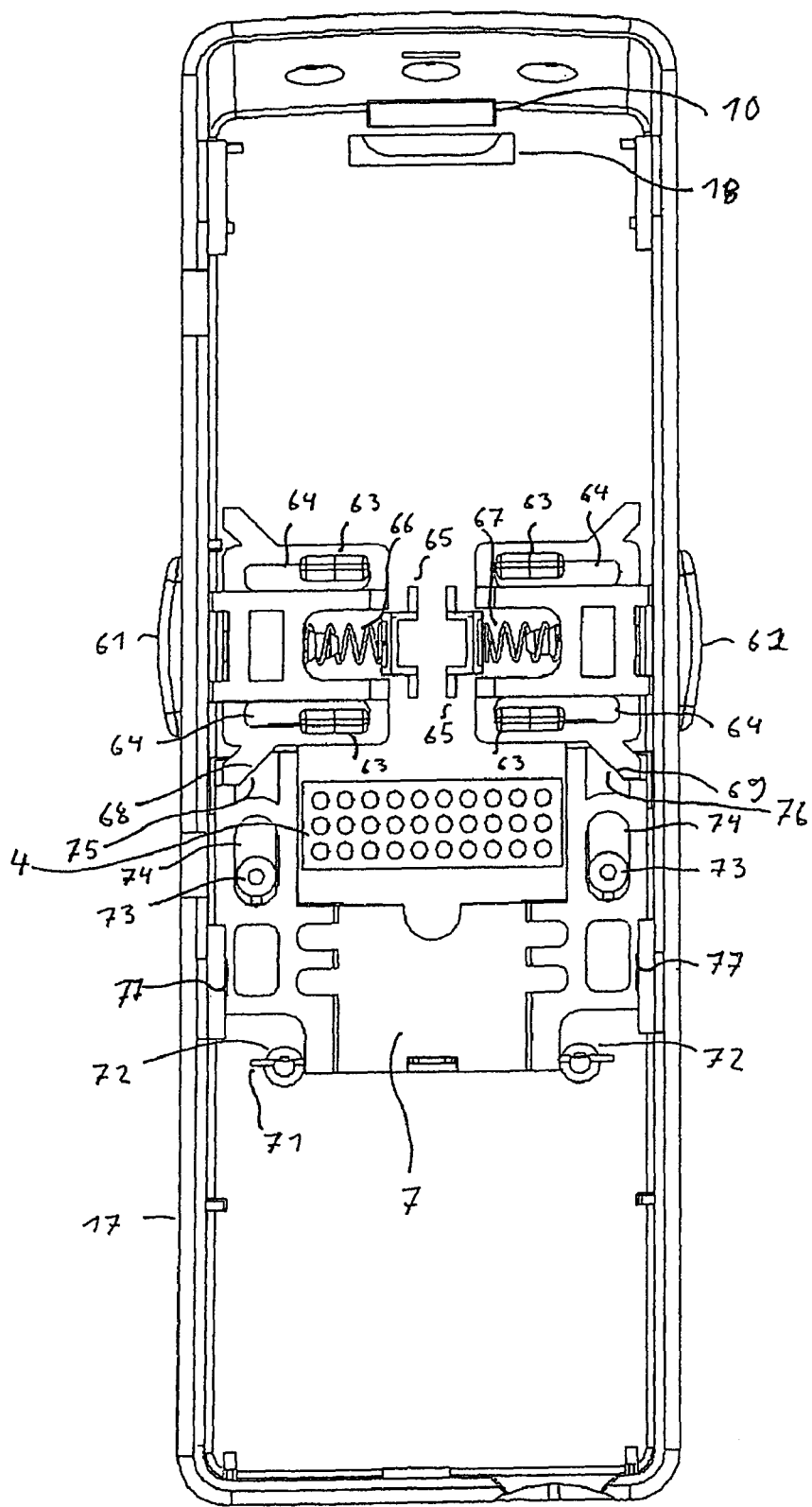
FIG. 6 shows a functional illustration of the underside of the base part shown in FIG. 1.
Figure 7:
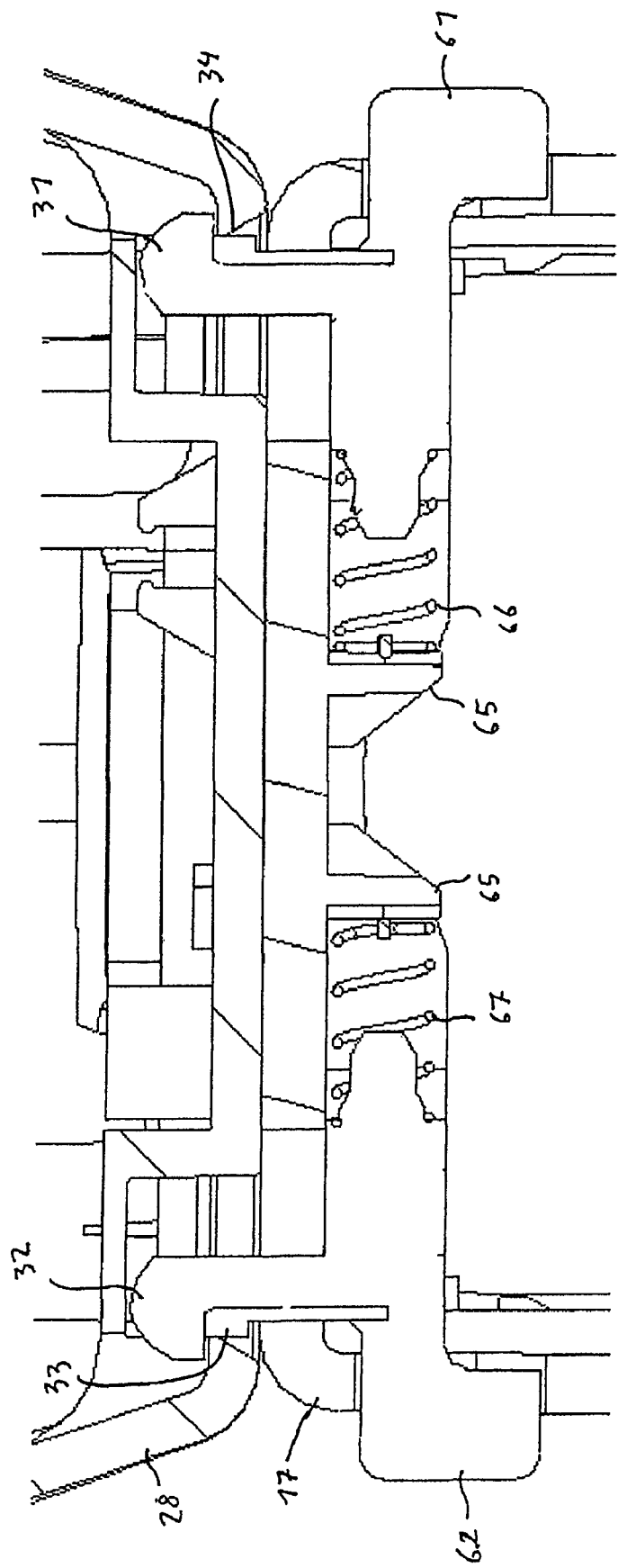
FIG. 7 shows a sectional illustration of the base part and of the retaining part when joined together.

With reference to FIGS. 6 and 7, a mechanism will now be explained by means of which the latching of the base part 1 to the retaining part 2 can be detached by the user.

FIG. 6 shows a rear view of the housing 17 with the mechanism lying within the housing 17. FIG. 6 thus shows the housing 17, a slide element 7, two actuating elements 61 and 62, three springs 71, 66 and 67 and the electrical connection element 4. Furthermore, the cutout 18 and the underside view of the hook element 10 can be seen in the top part of the housing part 17.

The slide element 7 has two slots 74 through which two screw-on domes 73, connected to the housing 17, for a printed circuit board are guided. Furthermore, the housing 17 has depressions in the region of the limbs of the slide element 7, the limbs of the slide element 7 being guided in said depressions.

Furthermore, knobs 77 are provided which are connected to the housing part 17 beneath the slide element 7 and prevent the limbs of the slide element 7 from being knocked out. The spring 71 is retained by knobs 72 which are connected on both sides of the slide element to the housing part 17 and exerts a spring force, in the direction of the hook element 10, on the slide element 7. That side of the slide element 7 which is opposite the hook element 10 and the knobs 72 each have a groove for the purpose of guiding the spring 71.

The two actuating elements 61 and 62 each have two slots 64 through which hook-shaped guide elements 63 connected to the housing 17 engage. On the underside of the housing 17, two holders 65 are also formed which serve the purpose of supporting the helical springs 66 and 67. Owing to the helical springs 66 and 67, in each case a force, in the direction of the outside of the base part, is exerted on the actuating elements 61 and 62.

On the upper side of the actuating elements 61 and 62, the hook elements 32 and 31, respectively, are shaped such that the hook elements 32 and 31 move concomitantly, corresponding to the movement of the actuating elements 61 and 62, respectively. Furthermore, the hook elements 21 and 22 on the upper side of the sliding element 7 facing the underside of the housing 17 are shaped such that the movement of the hook elements 21 and 22 corresponds to the movement of the slide element 7.

The limbs of the slide element 7 have beveled faces 75 and 76 at their top ends, said faces 75 and 76, as shown in FIG. 6, being in touching contact with correspondingly beveled faces 68 and 69 of the actuating elements 61 and 62, respectively. As a result, a transverse movement of the actuating elements 61 and 62 is converted into a longitudinal movement of the slide element 7. If the actuating elements 61 and 62 are pressed together, the transverse forces produced thereby are converted, owing to the beveled faces 68, 75 and 69 and 76, into a longitudinal movement of the slide element 7 in the direction of that side of the base part which is remote from the hook element 10.

FIG. 7 illustrates the latched state of the base part 1 and the retaining part 2. FIG. 7 shows the housing 17 of the base part 1 and the part housing 28 of the retaining part 2. Also shown are the actuating elements 61 and 62 on whose upper sides the hook elements 31 and 32 are formed. The hook elements 31 and 32 are in this case guided through the cutouts 33 and 34, respectively, of the part housing 28, as a result of which the part housing 28 is latched to the housing 17. Furthermore, the helical springs 66 and 67 are shown in FIG. 7 which, on the one hand, act on the holders 65 formed on the underside of the housing 17 and, on the other hand, act on the actuating elements 61 and 62.

Furthermore, it is also possible for the hook elements as shown in FIG. 1 to be arranged on the retaining part of the retaining device and for the associated cutouts as shown in FIG. 2 to be arranged on the base part of the retaining device, and thus for the mechanical connection elements of the retaining part and the base part to be interchanged. In accordance with this embodiment, the mechanical arrangement as shown in FIG. 6 would thus also be arranged in the retaining part and not in the base part. Furthermore, the same design possibilities as in the description relating to FIGS. 1 to 7 result here.

What is claimed is:

1. A retaining device for the purpose of mechanically and electrically connecting a mobile user device, in particular a mobile radio telephone or a PDA, to a vehicle, the retaining device comprising:
    a base part for the purpose of permanently fixing it in the vehicle; and
    a retaining part for the purpose of accommodating the mobile user device,
    wherein the base part has at least one rigid first hook element and at least one resilient second hook element which are arranged at a distance from one another protruding upward on the upper side of the base part facing the retaining part, and the base part has an electrical connection element for the purpose of electrically connecting the base part to the retaining part, said electrical connection element being arranged on the upper side of the base part facing the retaining part between the at least one rigid first hook element and the at least one resilient second hook element, and the underside of the retaining part facing the base part has at least one first cutout for the purpose of latching with a first hook element and at least one second cutout, which is arranged at a distance from said first cutout, for the purpose of latching with a second hook element, and the retaining part has an electrical connection element for the purpose of electrically connecting the retaining part to the base part, said electrical connection element being arranged on the underside of the retaining part facing the base part between the at least one first cutout and the at least one second cutout, and the base part has at least one third resilient hook element which is arranged between the first hook element and the electrical connection element, and the retaining part has at least one third cutout which is arranged between the first cutout and the electrical connection element.

2. The retaining device as claimed in claim 1, wherein the electrical connection elements have two or more electrically conductive contact elements arranged in one or more rows, the contact elements of the connection element of the base part and the contact elements of the connection element of the retaining part being in touching contact such that they are aligned with one another at their mutually facing ends when the base part and the retaining part are latched.

3. The retaining device as claimed in claim 2, wherein the electrical connection element has two or more electrically conductive contact elements in an arrangement with three rows.

4. The retaining device according to claim 2, wherein the electrical connection element of the base part has two or more electrically conductive contact elements which form contact faces with their end faces, and in that the electrical connection element of the retaining part has two or more electrically conductive contact elements which are in the form of contact pins.

5. The retaining device as claimed in claim 2, wherein the contact elements of the connection element of the retaining part are mounted in a resilient manner.

6. The retaining device as claimed in claim 2, wherein the base part and the retaining part have one or more centering elements or associated centering cutouts.

7. The retaining device as claimed in claim 1, wherein the electrical connection elements are used for transmitting RF and AF signals.

8. The retaining device as claimed in claim 1, wherein two or more adjacent contact elements transmit RF signals, and one or more of the remaining contact elements transmit AF signals or are used for power supply purposes.

9. A base part of a retaining device for the purpose of mechanically and electrically connecting a mobile user device, in particular a mobile radio telephone or a PDA, to a vehicle, comprising:
    the base part (1) being provided for the purpose of permanently fixing it in the vehicle; and
    the retaining part being provided for the purpose of accommodating the mobile user device, wherein the base part has at least one rigid first hook element and at least one resilient second hook element which are arranged at a distance from one another protruding upward on the upper side of the base part facing the retaining part, and the base part has an electrical connection element for the purpose of electrically connecting the base part to the retaining part, said electrical connection element being arranged on the upper side of the base part facing the retaining part between the at least one rigid first hook element and the at least one resilient second hook element, and the base part has at least one third resilient hook element which is arranged between the first hook element and the electrical connection element.

10. The base part as claimed in claim 9, wherein the base part has a centrally arranged first hook element and two second hook elements which are arranged at a distance from one another.

11. The base part as claimed in claim 9, wherein at least one second hook element is mounted in a resilient manner such that it can move in the longitudinal direction of the base part, and the hooks of the first hook element and the hooks of the second hook element are oriented in opposition.

12. The base part as claimed in claim 9, wherein the base part comprises at least one third hook element that is mounted in a resilient manner such that it can move transversely with respect to the longitudinal direction of the base part.

13. The base part as claimed in claim 9, wherein at least one third hook element is mounted in a resilient manner such that it can move and such that it is offset through 90° with respect to the second hook element.

14. The base part as claimed in claim 9, wherein the base part has at least one second hook element which is mounted in a resilient manner such that it can move in the longitudinal direction of the base part and two third hook elements which are mounted in a resilient manner such that they can move in opposition transversely with respect to the longitudinal direction of the base part.

15. The base part as claimed in claims 9, wherein the base part has two second hook elements which are arranged in the immediate vicinity of the corners of the electrical connection element.

16. The base part as claimed in claim 9, wherein the base part has a slide element which is mounted in a resilient manner, can move in the longitudinal direction of the base part and is connected to the at least one second hook element, and the base part has at least one actuating element which can move transversely with respect to the longitudinal direction of the base part and is mounted in a resilient manner, the slide element and the actuating element having beveled faces which are in touching contact with one another such that a transverse movement of the at least one actuating element is converted into a longitudinal movement of the slide element.

17. The base part as claimed in claim 16, wherein a third hook element is connected to the at least one actuating element.

18. The base part as claimed in claim 16, wherein the base part has two third hook elements and two actuating elements arranged in opposition, one third hook element being connected to one actuating element, and the other third hook element being connected to the other actuating element, and in this case the hooks of the two hook elements being oriented in opposition.

19. The base part as claimed in claim 16, wherein the base part has a first spring which exerts a force, in the direction of the first, fixed hook element, on the slide element, and the base part has a second spring which exerts a force, in the direction of the outside of the base part, on the at least one actuating element.

20. A retaining part of a retaining device for the purpose of mechanically and electrically connecting a mobile user device, in particular a mobile radio telephone or a PDA, to a vehicle, comprising:
the base part being provided for the purpose of permanently fixing it in the vehicle, and
the retaining part being provided for the purpose of accommodating the mobile user device,
wherein the underside of the retaining part facing the base part has at least one first cutout for the purpose of latching with a first hook element of the base part and at least one second cutout, which is arranged at a distance from said first cutout, for the purpose of latching with a second hook element of the base part, and the retaining part has an electrical connection element for the purpose of electrically connecting the retaining part to the base part, said electrical connection element being arranged on the underside of the retaining part facing the base part between the at least one first cutout and the at least one second cutout, and the at least one second cutout, and the retaining part has at least one third cutout which is arranged between the first cutout and the electrical connection element.

21. The retaining part as claimed in claim 20, wherein the retaining part has two second cutouts which are arranged in the immediate vicinity of the corners of the electrical connection element.

22. The retaining part as claimed in claim 20, wherein the retaining part has two third cutouts which are arranged opposite one another in the immediate vicinity of the longitudinal edges of the retaining part.

* * * * *